(12) United States Patent
Olson et al.

(10) Patent No.: US 7,600,480 B2
(45) Date of Patent: Oct. 13, 2009

(54) TREE SPADE FOR ATV

(75) Inventors: Alan D. Olson, 3805 20th St., South, Fargo, ND (US) 58104; Roger A. Olson, Moorhead, MN (US)

(73) Assignee: Alan D. Olson, Fargo, ND (US)

( * ) Notice: Subject to any disclaimer, the term of this patent is extended or adjusted under 35 U.S.C. 154(b) by 286 days.

(21) Appl. No.: 11/562,622

(22) Filed: Nov. 22, 2006

(65) Prior Publication Data
US 2008/0115705 A1    May 22, 2008

(51) Int. Cl.
| A01C 11/00 | (2006.01) |
| A01C 13/00 | (2006.01) |
| A01G 23/02 | (2006.01) |
| A01G 23/06 | (2006.01) |
| E02F 3/04  | (2006.01) |

(52) U.S. Cl. ............................ 111/101; 37/302; 37/412; 37/435

(58) Field of Classification Search ............ 37/231, 37/302, 412, 417, 435; 111/101
See application file for complete search history.

(56) References Cited

U.S. PATENT DOCUMENTS

| 2,642,791 A | 6/1953 | Peacock, Sr. |
| 2,755,570 A | 7/1956 | Blackburn et al. |
| 2,998,087 A | 8/1961 | Iddings |
| 4,247,030 A | 1/1981 | Amacker |
| 4,403,427 A | 9/1983 | Dahlquist |
| 4,709,955 A | 12/1987 | Peters et al. |
| 4,796,941 A | 1/1989 | Reilly |
| 5,485,691 A | 1/1996 | Stevens et al. |
| 5,600,904 A | 2/1997 | Bowling |
| 5,845,918 A | 12/1998 | Grinde et al. |
| 5,957,213 A | 9/1999 | Loraas et al. |
| 6,070,344 A | 6/2000 | Roberts |
| 6,722,296 B2 | 4/2004 | Reilly |
| 2005/0196261 A1 | 9/2005 | Green |

OTHER PUBLICATIONS

Tree Toad Tree Transplanters [Online], [Retrieved on Nov. 29, 2006]. Retrieved from the Internet:<URL: http://www.treetoad.com/>.

*Primary Examiner*—Christopher J. Novosad
(74) *Attorney, Agent, or Firm*—Marsh Fischmann & Breyfogle LLP

(57) ABSTRACT

A tree spade (40) that is mounted on an all terrain vehicle (12) is disclosed. The tree spade (40) includes a support frame (48) that is able to pivot relative to the all terrain vehicle (12) between a transport position and an operational position. A blade frame (70) is mounted on and movable relative to the support frame (48). At least two blade assemblies (85) are mounted to the blade frame (70) for digging holes, lifting a tree and a corresponding dirt core, and supporting the same during transport. A pulley system (110) is interconnected with each of the all terrain vehicle (12), the support frame (48), and the blade frame (70) such that operation of a single actuator (74) moves the blade frame (70) along a column (54) of the support frame (48) and also pivots the support frame (48) relative to the all terrain vehicle (12).

41 Claims, 10 Drawing Sheets

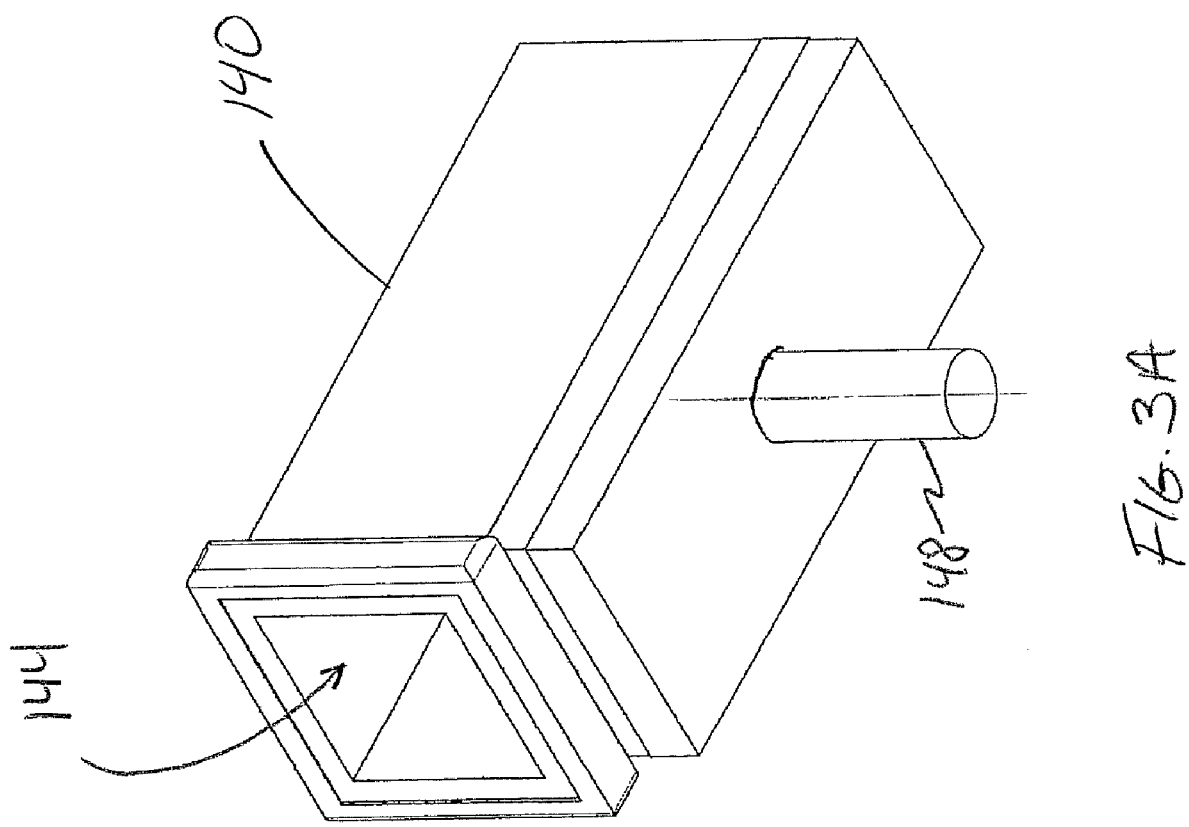

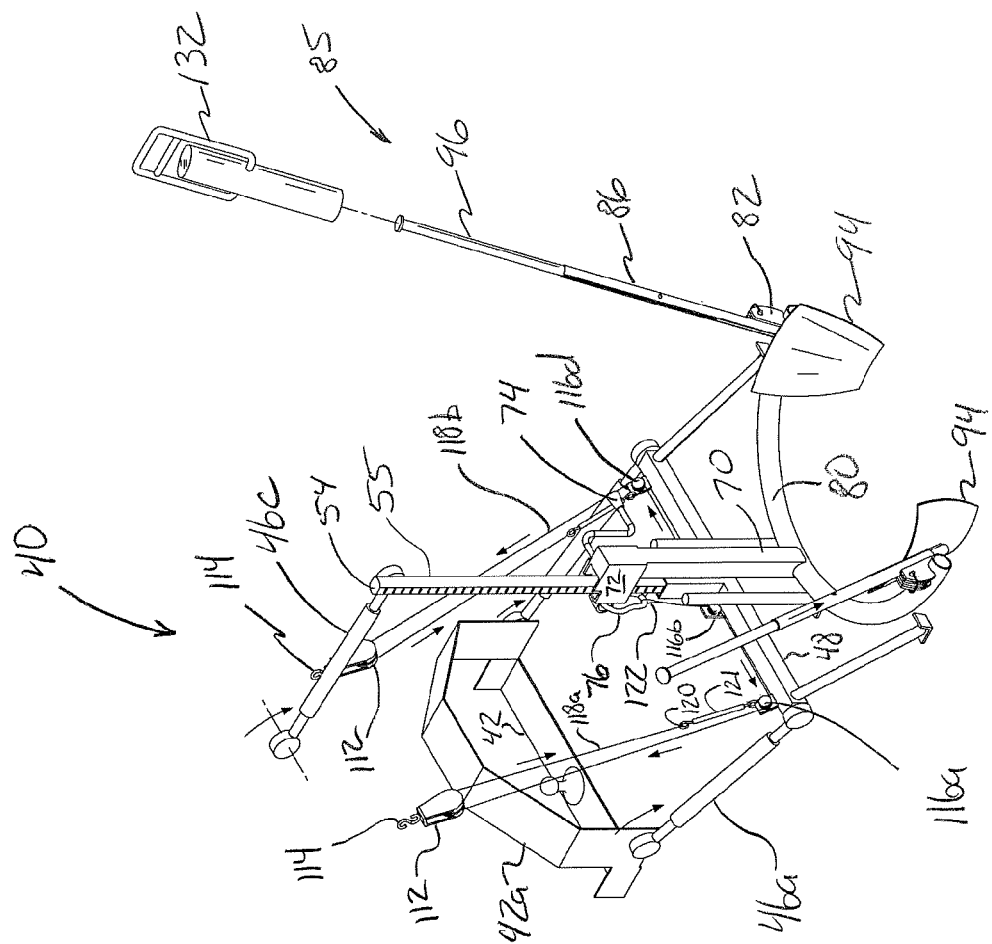
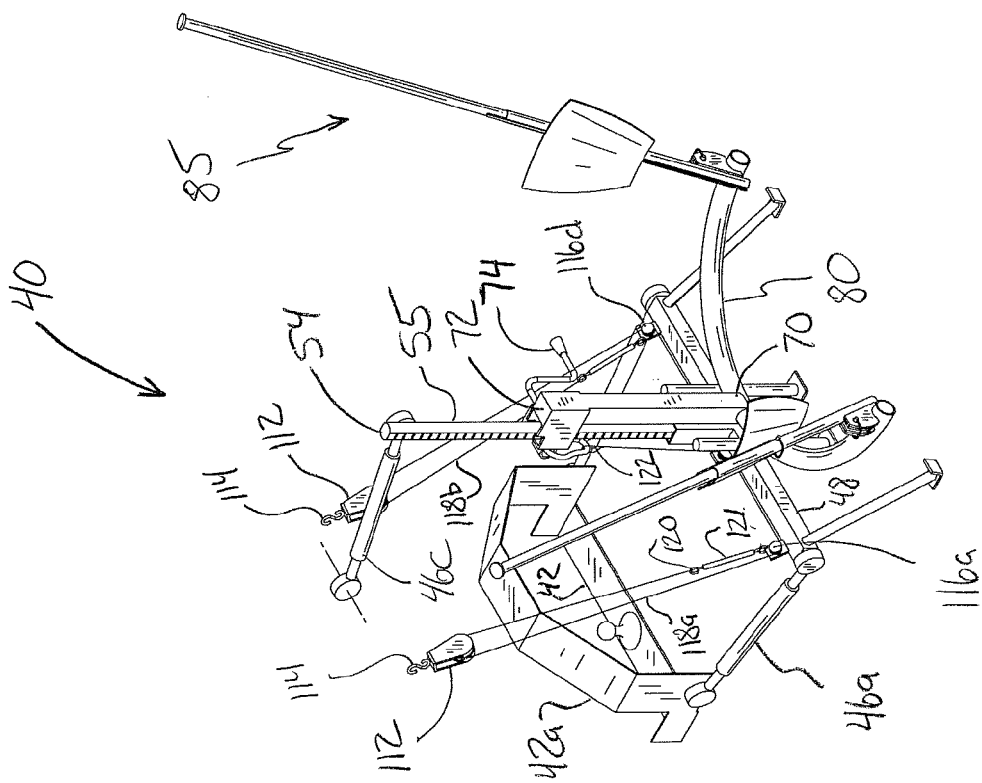
FIG.6A
FIG.6B

TREE SPADE FOR ATV

FIELD OF THE INVENTION

The present invention is generally directed to the field of tree spades—devices for planting/transplanting plants such as trees, shrubs, or the like.

BACKGROUND OF THE INVENTION

A "tree spade" is a commonly used term to describe a device that may be used to dig a hole into which a tree may be disposed, to dig a hole in a manner that encompasses the roots of a tree so as to be able to lift the tree and its roots out of the hole, and to transport a tree with its roots to another location for planting. Tree spades are available in a number of forms. There are of course the large commercial trucks that incorporate a tree spade on the rear end thereof. Various other more "personal use" types of tree spades are available as well. For instance, there is a commercially available tree spade that is mounted on a small cart that may be manually advanced by an individual. Tree spades have also been incorporated onto trailers that may be pulled by a vehicle. Reference has also been made to having tree spade attachments for front-end loaders or the like.

Although each of these types of tree spades serves a need, there are some points of note. Commercial-type units are quite expensive. Commercial-type units are also quite bulky and heavy, possibly impacting the ability to manipulate the same in an existing yard and they also are prone to leaving large ruts in an existing yard. Trailer-type units may provide a cost savings over commercial-type units. However, trailer-type units may still be rather bulky to store, may be hard to manipulate for those not experienced with backing up a trailer, and still may be of a weight that may form ruts in an existing yard.

Tree spades attachments for front-end loaders or the like are easily maneuverable by experienced operators. However and based upon the manner in which these devices may be moved, the potential still exists that the yard may be damaged. The weight of front-end loaders in effect prevents their use for tree spade applications unless lawns are relatively dry, or ruts and damage will occur. Furthermore, although front-end loaders are commonly employed by construction companies, farmers, and the like, many homeowners do not have access to a front-end loader. Although hand-operated tree spades may be of a more economical nature, manually moving trees from one location to another can be physically exhausting. Hand-operated tree spades are also ergonomically not feasible when considering uneven ground conditions, soft soil conditions, and/or when it is required to transport a tree over an extended distance.

SUMMARY OF THE INVENTION

A first aspect of the present invention is generally directed to what may be characterized as a plant handling device. This device includes an all terrain vehicle and a plant spade that is mounted on this all terrain vehicle.

Various refinements exist of the features noted in relation to the first aspect of the present invention. Further features may also be incorporated in the first aspect of the present invention as well. These refinements and additional features may exist individually or in any combination. The various features that will now be discussed each pertain to the first aspect.

The plant handling device may be used for any appropriate plant. Typically, the plant may be in the form of a tree, a shrub, or the like, and will typically be of a smaller variety (e.g., about a 2 inch trunk diameter or less). In any case, the plant handling device may be used to dig a hole for receipt of a plant, to move a plant from one location to another, to deposit a plant into an existing plant hole (for instance one that was previously dug by the plant handling device), or any combination thereof.

The all terrain vehicle may be of any appropriate size, shape, configuration, and/or type. For instance, the all terrain vehicle may be in the form of a three-wheeler or a four-wheeler. In any case, the shocks of the all terrain vehicle may be replaced by one or more rods or struts of a fixed length or of a rigid configuration to accommodate a lifting of a load by the plant spade. If the stiffness of the shocks of the all-terrain vehicle is adjustable, another option would be to increase their stiffness an appropriate amount to accommodate use of the plant spade with the all terrain vehicle.

The plant spade may be mounted to the all terrain vehicle in any appropriate manner. In one embodiment, the plant spade is detachably mounted to the all terrain vehicle. For instance, the plant spade may include a hitch mounting frame that may be detachably mounted to an existing hitch of the all terrain vehicle. Each of the hitch mounting frame and the hitch may be of any appropriate size, shape, configuration, and/or type (e.g., conforming to the industry standard "Category 0" hitch requirements). As will be discussed in more detail below, the plant spade may also interface with the all terrain vehicle at one or more additional locations.

In one embodiment, the above-noted hitch mounting frame of the plant spade includes a hole. This hole may be aligned with a hole on the hitch of the all terrain vehicle and a ball/nut or bolt/nut configuration may be used to secure the plant spade to the all terrain vehicle. In another embodiment, a first hitch adapter member may include a pin that is directed through the hole on the hitch of the all terrain vehicle. A nut may be used to secure this first hitch adapter member to the hitch of the all terrain vehicle. A second hitch adapter may be appropriately mounted (e.g., welded) to a mounting frame of the plant spade. The first and second hitch adapter members may be engaged and then detachably secured together (e.g., using a locking pin or the like). One of the first and second hitch adapter members may be in the form of a male member, and the other may be in the form of a receiver. This second embodiment may enhance the versatility of the plant spade in relation to being usable with a variety of all terrain vehicle hitch configurations.

At least part of the plant spade may be characterized as being movably (e.g., pivotally) interconnected with the all terrain vehicle (including indirectly via the above-noted hitch mounting frame). In one embodiment, the plant spade includes a first frame, a second frame, and at least two shovels or blades. The first frame is movable relative to the all terrain vehicle (e.g., pivotable), the second frame is movably interconnected with the first frame, and the two blades are each interconnected with and movable relative to the second frame. One or more additional blades could be utilized as well.

The above-noted first frame of the plant spade may be movable between at least generally two positions. The entirety of the plant spade may be spaced above the ground when the first frame is in a first position (e.g., a transport position). The first frame may be supported by the ground at one or more locations (e.g., via one or more feet or the like) when the first frame is moved to a second position (e.g., an operational position—on that accommodates operation of the plant spade—to dig a hole, to remove a plant from the ground, to position a plant within an existing hole). The second frame is also movable relative to the first frame, including after the first frame contacts the ground and so as to dispose part of the second frame in contact with the ground as well.

In one embodiment, at least a certain movement of the above-noted second frame relative to the first frame also causes the first frame to move relative to the all terrain vehicle. For instance, a movement of the second frame at least generally toward the ground and relative to the first frame may also cause the first frame to move from its transport position to a position where the first frame is engaged with the ground at one or more locations (e.g., by one or more supports, feet or the like). Conversely, a movement of the second frame at least generally away from the ground and relative to the first frame may also cause the first frame to move from its position where the first frame is supported by the ground to the above-noted transport position where the first frame is spaced from the ground.

Consider the case where the plant handling device includes an actuator, such as a crank that is movably interconnected with the second frame and that also interfaces with the first frame. A first activation of this actuator may move the second frame relative to the first frame (e.g., axially) in a first direction and may simultaneously cause the first frame to undergo a first motion (e.g., pivotal). For instance, this first activation may move the second frame relative to the first frame toward the ground on which the all terrain vehicle is disposed, and may simultaneously move the first frame relative to the all terrain vehicle and into contact with the ground. A second activation of this actuator may move the second frame relative to the first frame (e.g., axially) in a second direction that is opposite of the first direction, and further may simultaneously cause the first frame to undergo a second motion (e.g., pivotal) that is opposite of the noted first motion. For instance, this second activation may move the second frame relative to the first frame away from the ground on which the all terrain vehicle is disposed, and may simultaneously move the first frame relative to the all terrain vehicle and out of contact with the ground.

The plant spade may include first, second, and third links that are each pivotally interconnected with the all terrain vehicle at spaced locations, and further that are each pivotally interconnected with the above-noted first frame at spaced locations as well. Each of these first, second, and third links may be of any appropriate size, shape, configuration, and/or type (e.g., of a fixed length; of a variable length). The all terrain vehicle may have an axle that extends in what may be characterized as a lateral or a side-to-side dimension (e.g., orthogonal to the direction in which the all terrain vehicle travels). The third link may be pivotally interconnected with the all terrain vehicle at a location in the lateral dimension that is between where the first and second links are pivotally interconnected with the all terrain vehicle in the lateral dimension, the third link may be pivotally interconnected with the first frame at a location in the lateral dimension that is between where the first and second links are pivotally interconnected with the all terrain vehicle in the lateral dimension, or both. The first and second links may be pivotally interconnected with the first frame at a common elevation, and the third link may be pivotally interconnected with the first frame at a higher elevation (e.g., the pivot pin between the third link and the first frame may be at a higher elevation than the pivot pin between the first link and the first frame, and further may be at a higher elevation than the pivot pin between the second link and the first frame).

One end of each of the above-noted first and second links may be pivotally interconnected with the above-noted hitch mounting frame of the plant spade, and their respective opposite ends may be pivotally interconnected with the first frame. The all terrain vehicle may include a rear carriage rack of any appropriate size, shape, configuration, and/or type. One end of the third link may be pivotally interconnected with this rear carriage rack (e.g., by an appropriate bracket) while an opposite end of the third link may be pivotally interconnected with an at least generally vertically extending column of the first frame. The second frame may advance along this column in either direction by operation of a crank or the like in the relevant direction (e.g., a jack or jack-like configuration).

The plant spade may further include a pulley system that is interconnected with each of the all terrain vehicle, the above-noted first frame, and the above-noted second frame. This pulley system may include a first cord and a first pulley. The first cord may be of any appropriate size, shape, configuration, and/or type (e.g., wire, rope, cable). One end of the first cord may be anchored to the first frame in any appropriate manner (e.g., detachably; directly or indirectly using an adjustable turnbuckle or the like), while the opposite end of the first cord may be anchored to the second frame in any appropriate manner as well (e.g., detachably; directly or indirectly using an adjustable turnbuckle or the like). The first pulley may be mounted on the first frame to redirect the first cord at a location somewhere between its opposing ends. The pulley system may further include a second cord and a second pulley. The second cord may be of any appropriate size, shape, configuration, and/or type (e.g., wire, rope, cable). One end of the second cord may be anchored to the first frame in any appropriate manner (e.g., detachably; directly or indirectly using an adjustable turnbuckle or the like), while the opposite end of the second cord may be anchored to the second frame in any appropriate manner as well (e.g., detachably; directly or indirectly using an adjustable turnbuckle or the like). The second pulley may be mounted on the second frame to redirect the second cord at a location somewhere between its opposing ends.

Additional pulleys may be utilized by the above-noted pulley system. For instance, third and fourth pulleys may each be mounted to the above-noted first frame, and a pair of pulleys may be interconnected with the all terrain vehicle ("ATV pulleys") such that the first cord progresses from its end that is anchored (directly or indirectly) to the first frame, to one of the ATV pulleys, back to the first pulley, over to the third pulley, and then to its end that is anchored to the above-noted second frame; and further such that the second cord progresses from its end that is anchored (directly or indirectly) to the first frame, to the other of the ATV pulleys, back to the second pulley, over to the fourth pulley, and then to its end that is anchored to the second frame. The position of the first and third pulleys may be characterized as being the mirror image of the position of the second and fourth pulleys. The third and fourth pulleys each may be at a location in the above-noted lateral dimension that is between a position of the first and second pulleys in the lateral dimension. The "order" of the noted pulleys in the lateral dimension may be the first pulley, the third pulley, the fourth pulley, and the second pulley. The first and third pulleys (associated with the first cord) may be characterized as being on one side of a midline of the plant spade, while the second and fourth pulleys (associated with the second cord) may be characterized as being on an opposite side of this midline. This midline may extend in a direction that is orthogonal to the noted lateral dimension.

The above-noted blades of the plant spade each may be individually disposable in a configuration where they are maintained in a fixed position relative to the second frame, and further may be disposable in configuration where they are movable (e.g., axially) relative to the second frame. In this regard, the plant handling apparatus may also include a fencepost driver that is manually operable or manually manipulated by a user, and that may be used to advance any of the blades into the ground at any one time. The all terrain vehicle may include an appropriate carrier for transporting this fencepost driver, such as at the front of the all terrain vehicle. Other apparatus may be accommodated by the plant handling device as well, such as a root cutter that may be detachably mounted on the above-noted first frame at any appropriated location.

A second aspect of the present invention is embodied by a plant spade that is attachable to a vehicle of any appropriate type (e.g., an all terrain vehicle). The plant spade includes a hitch mounting frame, a first frame, a second frame, and at least two blades. The hitch mounting frame is detachably interconnectable with a hitch of the vehicle. The first frame is movably interconnected with the hitch mounting frame. The second frame in turn is movably interconnected with the first frame. The blades are interconnected with and movable relative to the second frame.

A third aspect of the present invention is embodied by a plant spade that is attachable to a vehicle of any appropriate type (e.g., an all terrain vehicle). The plant spade includes a first frame, a second frame, at least two blades, and a pulley system. The first frame is movable relative to the vehicle when the plant spade is attached to the vehicle. The second frame in turn is movably interconnected with the first frame. The blades are interconnected with and movable relative to the second frame. The pulley system is interconnected with each of the first and second frames of the plant spade, and is also interconnectable with the vehicle.

A fourth aspect of the present invention is embodied by a plant spade that is attachable to a vehicle of any appropriate type (e.g., an all terrain vehicle). The plant spade includes a first frame, a second frame, at least two blades, and an actuator. The first frame is movable relative to the vehicle when the plant spade is attached to the vehicle. The second frame in turn is movably interconnected with the first frame. The blades are interconnected with and movable relative to the second frame. When the plant spade is attached to the vehicle and when the actuator undergoes a first activation, the second frame moves relative to the first frame in a first direction and simultaneously causes the first frame to undergo a first pivotal motion. When the plant spade is attached to the vehicle and when the actuator undergoes a second activation that is opposite of the noted first activation, the second frame moves relative to the first frame in a second direction that is opposite of the first direction and simultaneously causes the first frame to undergo a second pivotal motion that is opposite of the first pivotal motion.

Various refinements exist of the features noted in relation to each of the second, third, and fourth aspects of the present invention. Further features may also be incorporated in each of the second, third, and fourth aspects of the present invention as well. These refinements and additional features may exist individually or in any combination. Initially, the various features discussed above in relation to the plant spade used by the first aspect are equally applicable to the plant spade of each of the second, third, and fourth aspects.

The plant spade of the second, third, and fourth aspects may be used in relation to any type of plant. Typically, the plant may be in the form of a tree, a shrub, or the like, and will typically be of a smaller variety (e.g., about a 2 inch trunk diameter or less). In any case, the plant spade of the second, third, and fourth aspects may be used to dig a hole for receipt of a plant, to move a plant from one location to another, to deposit a plant into an existing plant hole (for instance one that was previously dug by the plant spade), or any combination thereof.

The vehicle to which the plant spade of the second, third, and fourth aspects may be attached may be of any appropriate size, shape, configuration, and/or type. In one embodiment, the vehicle is in the form of an all terrain vehicle (e.g., a three-wheeler or a four-wheeler). In this case, the shocks of the all terrain vehicle may be replaced by one or more rods or struts of a fixed length and/or of a rigid configuration to accommodate a lifting of a load by the plant spade when mounted thereto. If the all terrain vehicle has adjustable shocks, it may be such that the stiffness of the shocks may be sufficiently adjusted to accommodate the use of the plane spade.

BRIEF DESCRIPTION OF THE DRAWINGS

FIG. 3A is a perspective view of one embodiment of a hitch adapter member that may be detachably mounted on an existing hitch of an all terrain vehicle.

FIG. 3B is a perspective view of one embodiment of a hitch adapter member that may be mounted on a hitch mounting frame of a tree spade, and that may detachably interface with the hitch adapter member of FIG. 3A.

FIG. 6A is a view of the tree spade of FIG. 1 in an intermediate position between its transport position and its operational position.

FIG. 6B is a view of the tree spade of FIG. 1 in an operational position.

DETAILED DESCRIPTION

Figure 1:
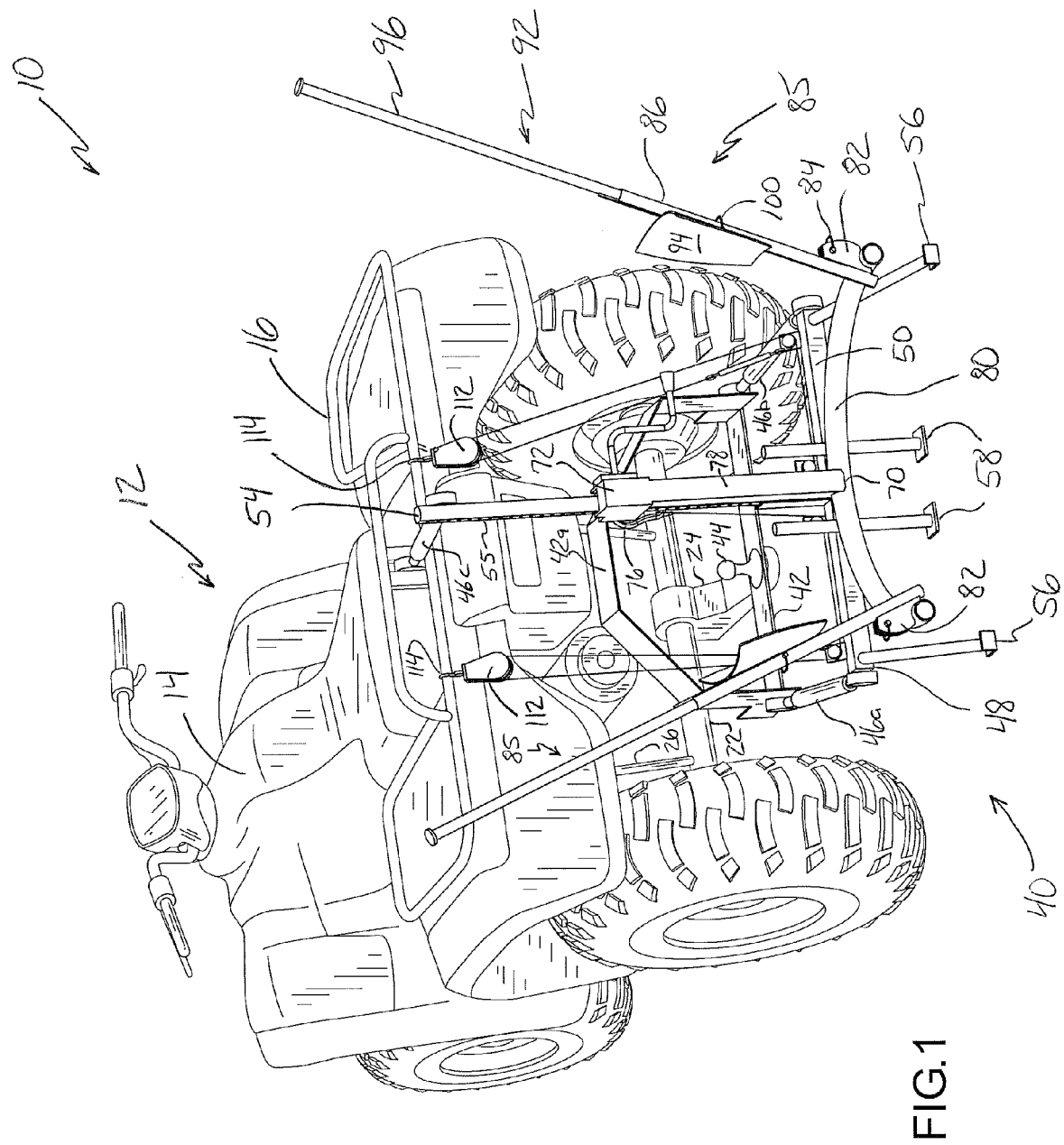
FIG. 1 is a perspective view of one embodiment of a tree spade mounted on one embodiment of an all terrain vehicle.
Figure 1A:
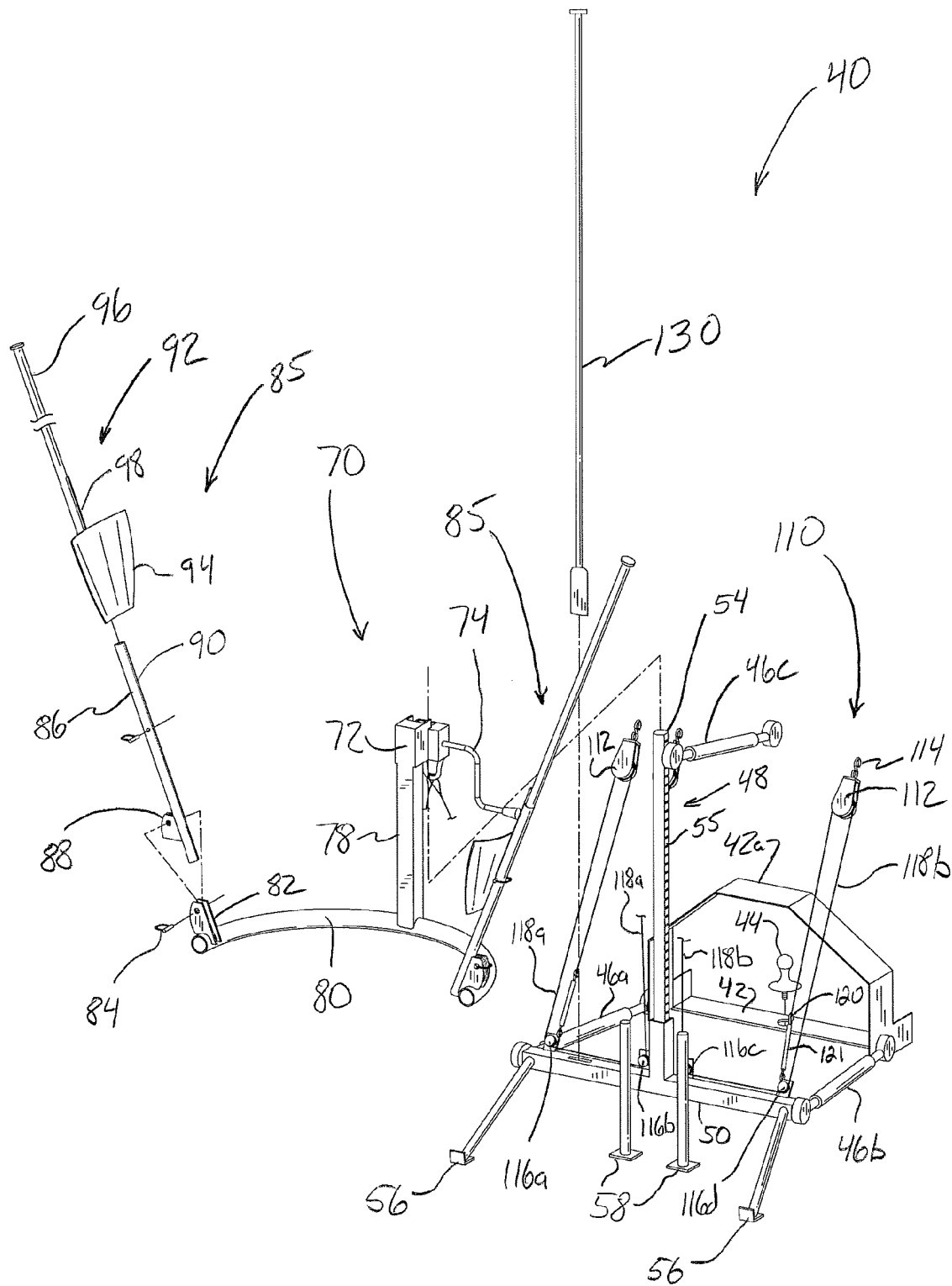
FIG. 1A is an exploded, perspective view of the tree spade of FIG. 1 from one angle.
Figure 1B:
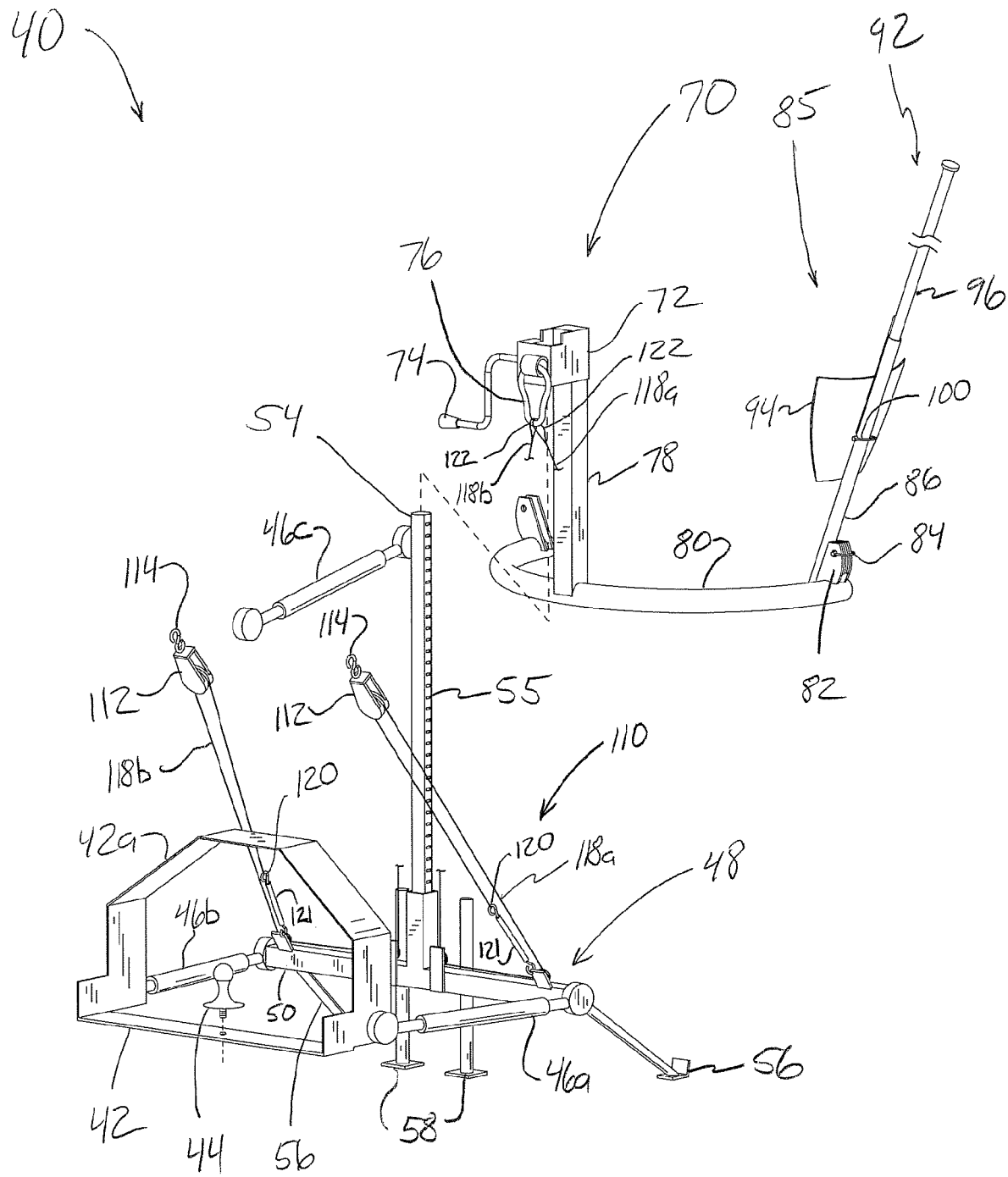
FIG. 1B is an exploded, perspective view of the tree spade of FIG. 1 from another angle, and with one of the blade assemblies being removed for clarity.
Figure 1C:
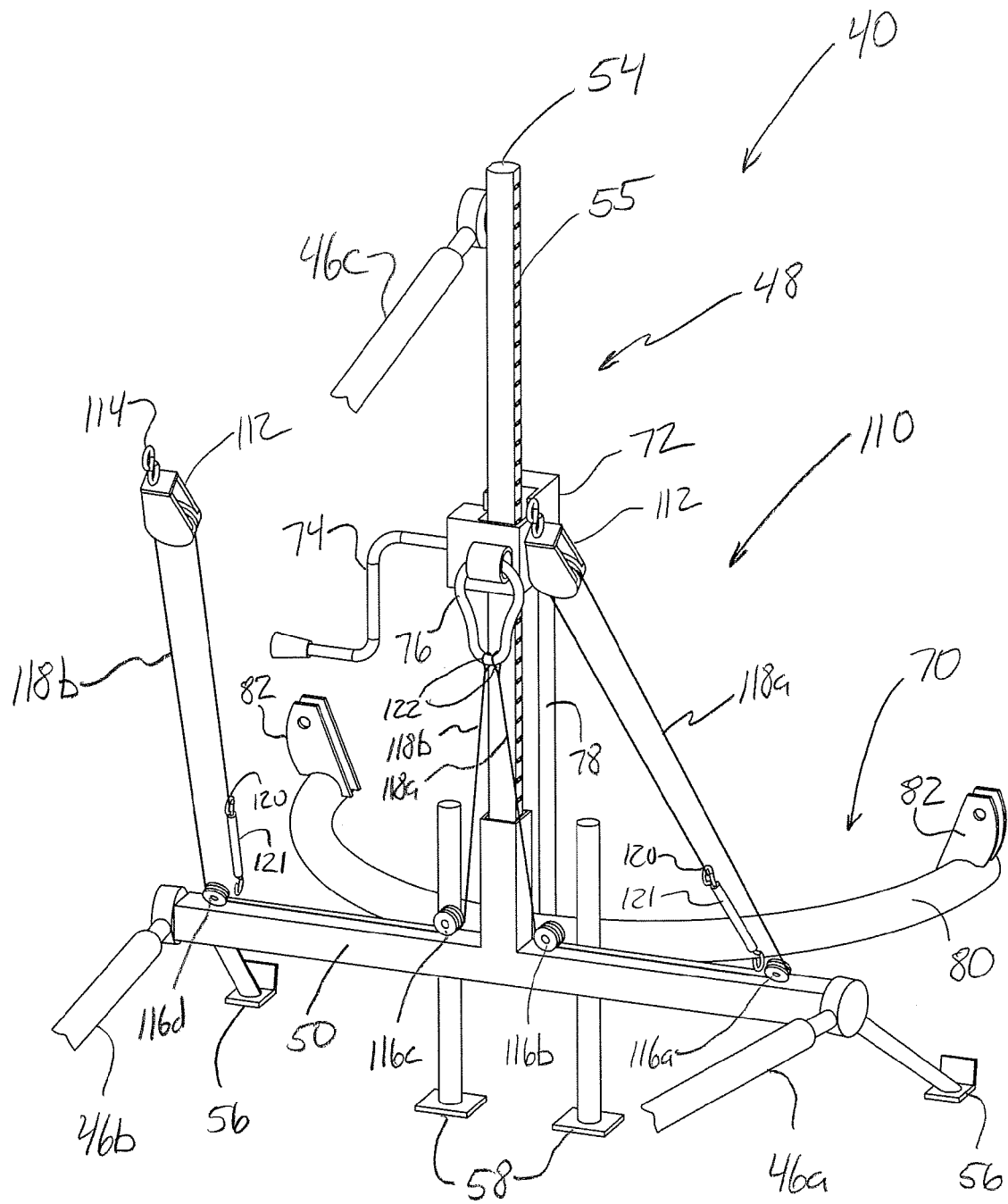
FIG. 1C is a perspective view of part of a pulley system used by the tree spade of FIG. 1, along with related componentry and with both of the blade assemblies being removed for clarity.

FIGS. 1, 1A, 1B, and 1C illustrate one embodiment of what may be characterized as a plant or tree handling device 10 (FIG. 1B only shows one of the two blade assemblies 85 for clarity; neither of the blade assemblies 85 are illustrated in FIG. 1C). There are two main components of the handling device 10—an all terrain vehicle 12 and a plant or tree spade 40. The handling device 10 may be used in relation to any appropriate plant, such as trees, shrubs, and the like. Since it is likely that the most common plant will be in the form of a tree, hereafter the handling device 10 and the spade 40 will be referred to as a "tree handling device 10" and a "tree spade 40." Functionally, the tree handling device 10 may be used to create a hole for receipt of a tree, to move or transport a tree from one location to another, to deposit a tree into an existing hole (for instance one that was previously dug by the tree handling device 10), or any combination thereof. In one embodiment, the tree spade 40 is sized for handling a maximum trunk diameter of about 2 inches (e.g., to handle trees having a trunk diameter of about 2 inches or less).

Figure 2A:
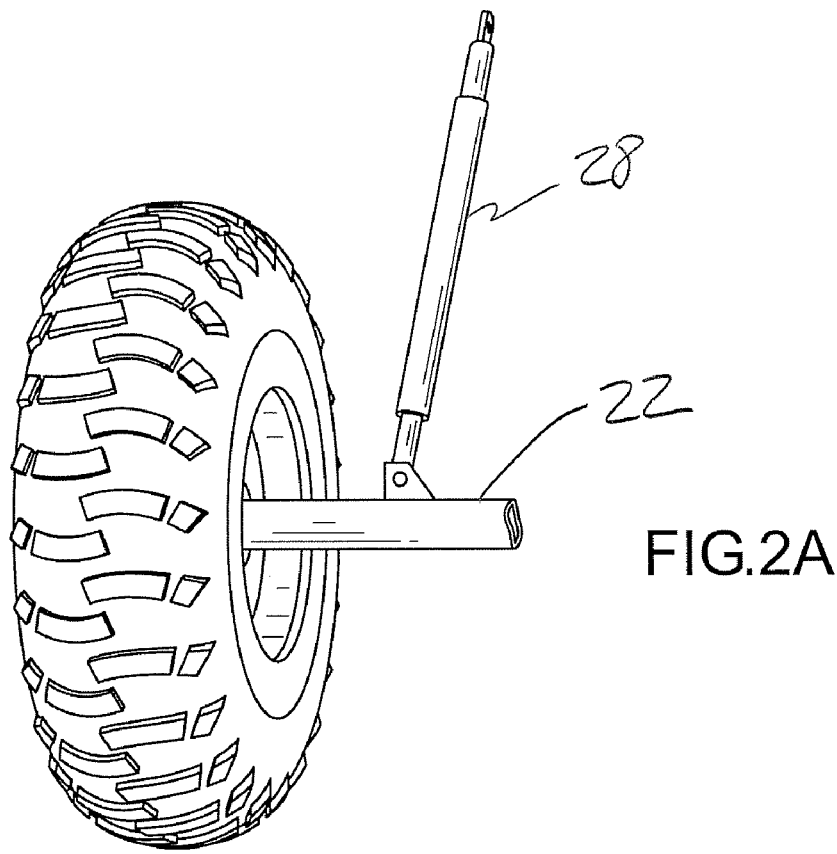
FIG. 2A is a perspective view of one interconnection between a rear axle of the all terrain vehicle of FIG. 1 and its body.
Figure 2B:
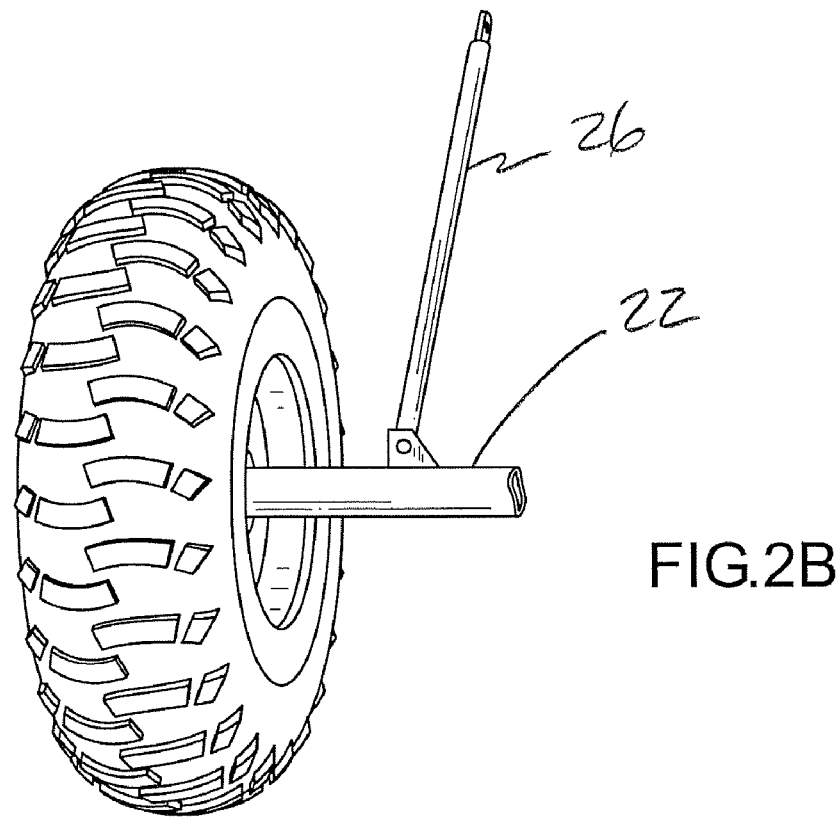
FIG. 2B is a perspective view of another interconnection between the rear axle of the all terrain vehicle of FIG. 1 and its body, and that accommodates the mounting of the tree spade on the all terrain vehicle.

The all terrain vehicle 12 may be of any appropriate size, shape, configuration, and/or type. For instance, the all terrain vehicle 12 may be in the form of a three-wheeler or a four-wheeler. There are a number of points of note in relation to the all terrain vehicle 12 for purposes of the tree handling device 10. It would be typical for a body 14 of the all terrain vehicle 12 to be supported by a pair of shocks 28 located toward the rear of the all terrain vehicle 12, and as illustrated in FIG. 2A. One end of each shock 28 would typically be anchored to a rear axle 22 of the all terrain vehicle 12, while its opposite end would typically be anchored to an appropriate location on the body 14 of the all terrain vehicle 12. These shocks 28 compress and expand in response to forces experienced by the all terrain vehicle 12. Although this is of course desirable for normal operation of the all terrain vehicle 12, it may adversely impact the operability of the tree spade 40. Therefore, the all terrain vehicle 12 is preferably reconfigured for the tree handling device 10 application. One option is for each of the shocks 28 to be replaced by a rod 26 that is of a fixed length and/or a rigid configuration—this provides at least somewhat of a rigid interconnection between the body 14 of the all terrain vehicle 12 and its rear axle 22. Each rod 26 may be of any appropriate size, shape, and/or configuration, and further may be anchored to any appropriate location on the rear axle 22 and the body 14. Although it would be typical to utilize two of such rods 26 and as shown in FIG. 1, any appropriate number of rods 26 may be utilized. Other ways of at least substantially maintaining the body 14 in at least a substantially fixed position relative to the rear axle 22 may be utilized. For instance, if the stiffness of the shocks 28 is adjustable, increasing their stiffness may accommodate the use of the tree spade 40.

Figure 3:
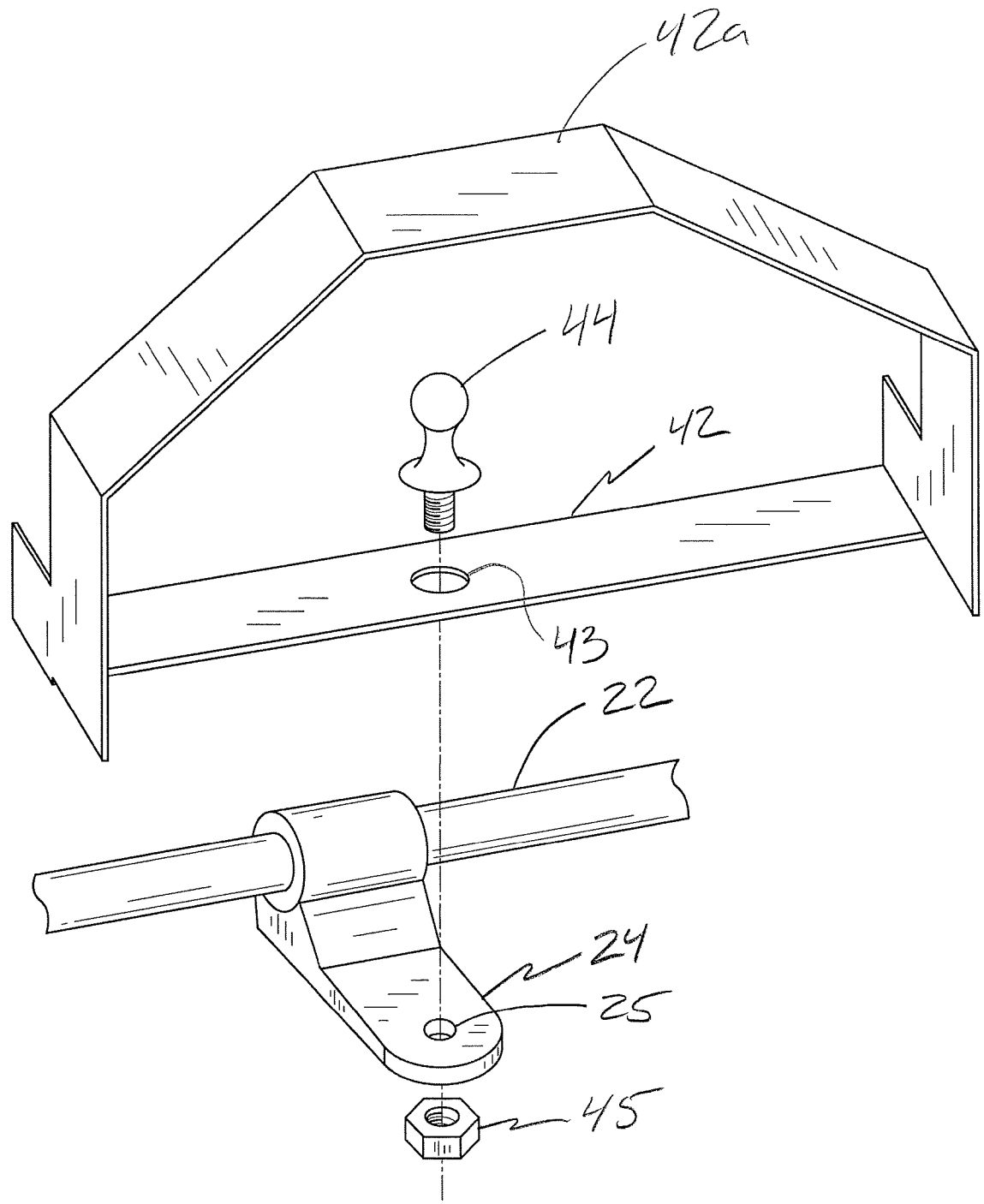
FIG. 3 is an exploded, perspective view of a lower interconnection between the all terrain vehicle and the tree spade of FIG. 1, namely a hitch for the all terrain vehicle and a hitch mounting frame for the tree spade.

Other components of the all terrain vehicle 12 are used in relation to its tree handling device 10 application. The all terrain vehicle 12 includes a hitch 24 on which the tree spade 40 may be mounted (FIG. 3). The hitch 24 may be of any appropriate size, shape, configuration, and/or type, such as the illustrated ball mount-type hitch or as a receiver-type hitch (not shown, but a hollow tube-like structure, typically of a square or rectangular cross-section). The tree spade 40 also interfaces with a rear carriage rack 16 of the all terrain vehicle 12, and which may be of any appropriate size, shape, and/or configuration.

Figure 4:
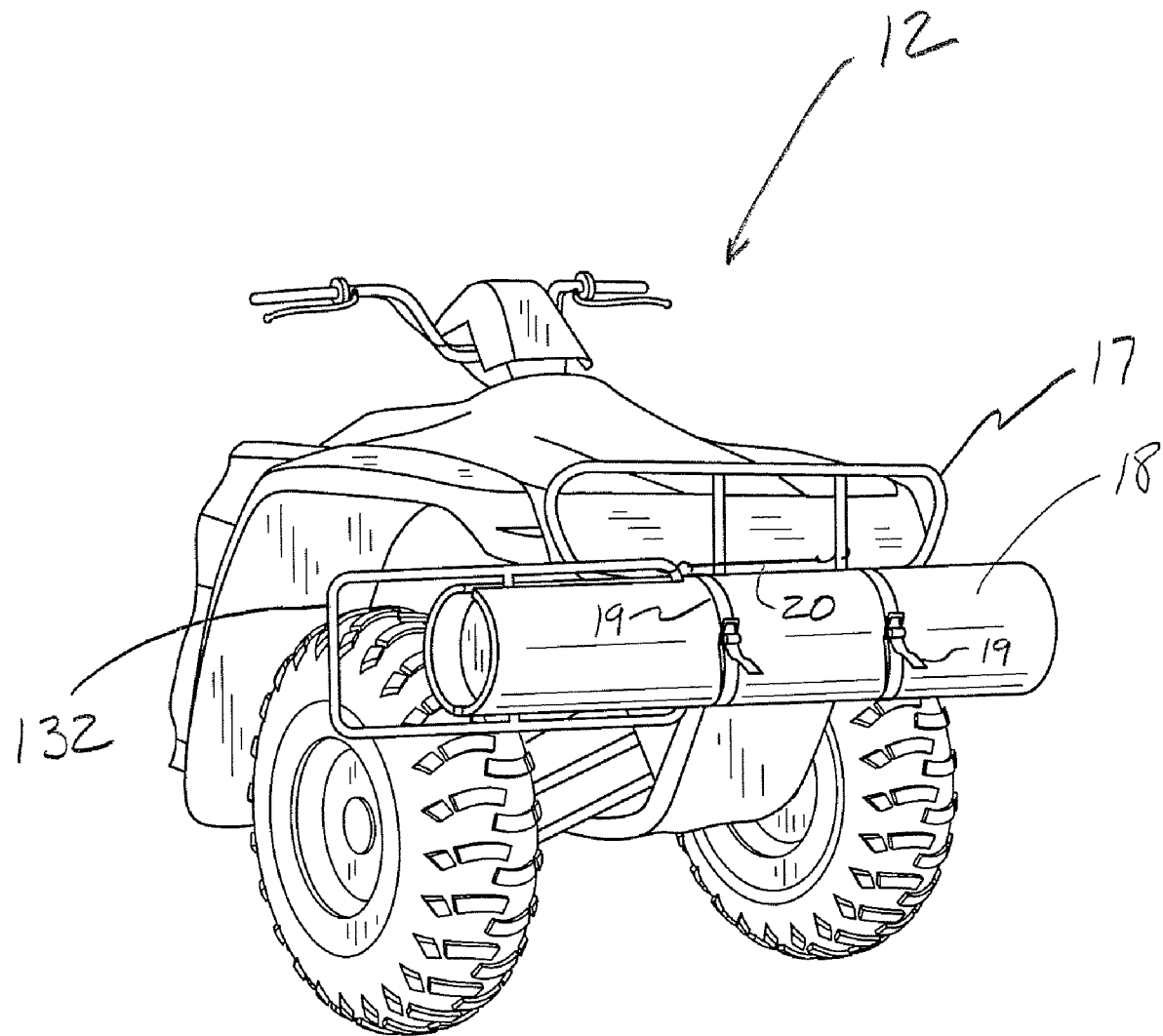
FIG. 4 is perspective view of one embodiment of a fencepost driver carrier mounted on the front of the all terrain vehicle of FIG. 1.
Figure 5:
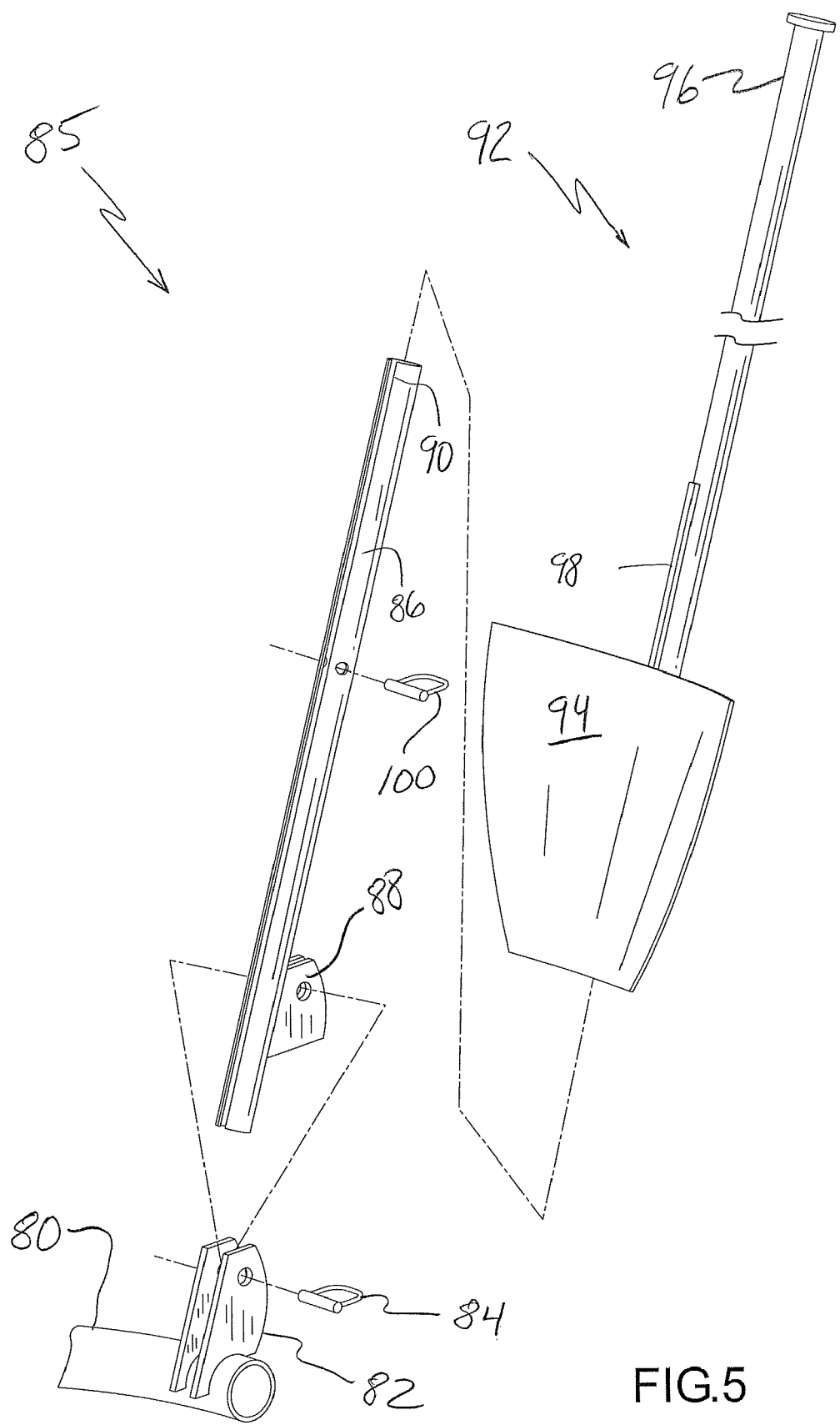
FIG. 5 is an exploded, perspective view of one of the blade assemblies used by the tree spade of FIG. 1.

A fencepost driver carrier 18 is mounted on the front of the all terrain vehicle 12 and as illustrated in FIG. 4. The fencepost driver carrier 18 may be of any appropriate size, shape, and/or configuration, and may be mounted to the all terrain vehicle 12 in any appropriate manner and at any appropriate location. However, the disclosed front mounting location adds ballast and enhances safety during transportation of a tree using the all terrain vehicle 12 and the tree spade 40. In the illustrated embodiment, the fencepost driver carrier 18 is detachably mounted to a frame 17 of the all terrain vehicle 12 by a plurality of straps 19. The fencepost driver carrier 18 accommodates on-board storage of a fencepost driver 132 that is used to operate the tree spade 40, and that will be discussed in more detail below. A retention strap 20 (e.g., a bungee cord) may be used to secure the fencepost driver 132 within the fencepost driver carrier 18, although such may not be required in all instances. Other appropriate ways of retaining the fencepost driver 132 within the fencepost driver carrier 18 may be utilized as well.

The tree spade 40 is appropriately mounted to the all terrain vehicle 12 (detachably in the illustrated embodiment). In this regard, the tree spade 40 includes a hitch mounting frame 42 that is mounted on the hitch 24 of the all terrain vehicle 12 by a ball 44 and a nut 45. A bridge 42a is illustrated as being part of the mounting frame 42, although such may not be required in one or more instances. The hitch mounting frame 42 may be of any appropriate size, shape, configuration, and/or type, and further may be formed from any appropriate material or combination of materials. The mounting frame 42 is placed on the hitch 24, with its mounting hole 43 being aligned with the mounting hole 25 of the hitch 24, and then the shaft of the ball 44 is directed therethrough. The nut 45 is then threaded onto the free end of this shaft.

A support frame 48 of the tree spade 40 (a first frame) is movably interconnected with the all terrain vehicle 12 via the hitch mounting frame 42 (i.e., the support frame 48 is indirectly mounted to the all terrain vehicle 12 in the illustrated embodiment). More specifically, a pair of pivot links or rods 46a, 46b are pivotally interconnected with each of the hitch mounting frame 42 (which again is mounted on the hitch 24 of the all terrain vehicle 12) and the support frame 48 of the plant spade 40 (e.g., via an appropriate pivot pin at each such location), while a pivot link or rod 46c is pivotally interconnected with each of the rear carriage rack 16 of the all terrain vehicle 12 (e.g., by an appropriate bracket) and the support frame 48 of the plant spade 40 (e.g., via an appropriate pivot pin at each such location). Each individual link 46a-c may be of any appropriate size, shape, configuration, and/or type, and further may be formed from any appropriate material or combination of materials. In the illustrated embodiment, the links 46a-c are of a fixed length, although it may be possible to accommodate the use of variable-length links (not shown). In any case, the pair of hitch mounting frame links 46a, 46b are pivotally interconnected with the support frame 48 at a common elevation, while the carriage rack link 46c is pivotally interconnected with the support frame 48 at a higher elevation than where the hitch mounting frame links 46a, 46b are pivotally interconnected with the same support frame 48.

A given all terrain vehicle may use the same type of hitch as the hitch 24, but it may differ in at least some manner. FIGS. 3A and 3B illustrate one way for dealing different configurations of the general hitch type of the hitch 24. FIG. 3A illustrates one embodiment of a hitch adapter member 140 that may be detachably mounted on the hitch 24 of the all terrain vehicle 12. The hitch adapter member 140 includes a receiver 144 of any appropriate shape, along with a pin 148. The pin 148 may be directed through the mounting hole 25 of the hitch 24. The nut 45 (FIG. 3) may then be threaded onto the end of the pin 148 that extends below the hitch 24 to secure the hitch adapter member 140 on to the hitch 24.

FIG. 3B illustrates a hitch adapter member 150 that is appropriately mounted on the hitch mounting frame 42 of the tree spade 40. Since the configuration of the pivot links 46a', 46b' in FIG. 3B are of different configuration from the remaining figures, they are further identified by a "single prime" designation. In any case, the hitch adapter member 150 may be directed into the receiver 144 of the hitch adapter member 140 to mount the tree spade 40 to the all terrain vehicle 12. As such, the receiver 144 and the hitch adapter member 43 will typically be correspondingly shaped. A locking pin or the like could be used to detachably fix the position of the hitch adapter member 150 of the tree spade 40 relative to the hitch adapter member 140 on the all terrain vehicle 12. Although the hitch adapter member 150 of the tree spade 40 is illustrated as being a male member and the hitch adapter member 140 on the all terrain vehicle 12 is illustrated as being the female member, the reverse configuration could be utilized.

The support frame 48 may be of any appropriate size, shape, and/or configuration, and further may be formed from any appropriate material or combination of materials. In the illustrated embodiment, the support frame 48 includes a cross member 50 (and to which the above-noted hitch mounting frame links 46a, 46b are pivotally interconnected) on which a root cutter 130 (e.g., a long-handled, chisel-like structure) may be detachably mounted in any appropriate manner, as well a column 54 (and to which the above-noted carriage rack link 46c is pivotally interconnected) that is at least generally vertically disposed or that extends at least generally in the vertical dimension.

The column 54 may be integrated with the cross member 50 in any appropriate manner. In the illustrated embodiment, the column 54 is directed into a hollow end of a tube that is appropriately fixed to the cross member 50. Another option would be for at least an end portion of the column 54 to be hollow and directed over a member that is fixed to and extends upwardly from the cross member 50. The column 54 could also be fixed directly to the cross member 50 in any appropriate manner. In any case, the column 54 may be of any cross-sectional profile taken perpendicularly to its length dimension, such as square, rectangular, or round, and includes a gear 55 that extends along at least a portion of its length.

The support frame 48 further includes a pair of side supports or feet 56 and a pair of central supports or feet 58 that are engageable with the ground on which the all terrain vehicle 12 is disposed. These supports 56, 58 provide stability to the support frame 48 when disposed in its operational position (where the supports 56, 58 engage the ground). In this regard, it should be noted that the pair of side supports 56 engage the ground at a location that is spaced in a longitudinal location from where the central supports 58 engage the ground (the longitudinal dimension being perpendicular or orthogonal to the above-noted lateral dimension). Therefore, these supports 56, 58 not only provide side-to-side stability, but fore-aft stability as well for the tree spade 40.

A blade frame 70 (a second frame) is movably mounted on the column 54 of the support frame 48. The blade frame 70 may be of any appropriate size, shape, configuration, and/or type, and further may be formed from any appropriate material or combination of materials. Advancing the blade frame 70 along the column 54 and its gear 55 of the support frame 48 is used to move each of the support frame 48 and the blade frame 70 between transport and operational positions in a manner that will be discussed in more detail below. In this regard, at least a portion of the exterior of the column 54 is contoured/configured to accommodate controlled movement of the blade frame 70 along the column 54 (e.g., the above-noted gear 55, which may be in the form of a plurality of ridges, teeth, or the like that are spaced along the length of the column 54).

The blade frame 70 includes a head or collar 72 that is movably mounted on the column 54 of the support frame 48. Other components of the blade frame 70 are addressed below. Preferably, the carriage rack link 46c (along with its associated pivot pin) may be detached or disconnected from the column 54 to allow the collar 72 of the blade frame 70 to be installed on or removed from column 54 of the support frame 48. In any case, the collar 72 provides the only direct interface between the blade frame 70 and the support frame 48.

A crank 74 is interconnected with the collar 72 of the blade frame 70 and interfaces with the gear 55 on the column 54 of the support frame 48 to advance the collar 72 of the blade frame 70 along the column 54 of the support frame 48. Any appropriate actuator of any size, shape, configuration, and/or type may be used to advance the blade frame 70 relative to the support frame 48. In the illustrated embodiment, the blade frame 70 is axially movable relative to the support frame 48. Movement of the crank 74 in one direction moves the blade frame 70 axially relative to the support frame 48 at least generally toward the ground on which the all terrain vehicle 12 is disposed, while movement of the crank 74 in the opposite direction moves the blade frame 70 axially relative to the support frame 48 at least generally away from the ground. At least a certain amount of movement of the blade frame 70 relative to the support frame 48 also causes the support frame 48 to move relative to the all terrain vehicle 12 (e.g., initiates a pivotal motion of the support frame 48). In this regard, a cable anchor 76 is provided for the blade frame 70, and in the illustrated embodiment is fixed to the collar 72. Other locations for the cable anchor 76 may be appropriate.

An offset section 78 of the blade frame 70 is fixed relative to and extends from the collar 72 (again, the collar 72 being movably mounted on the column 54 for the support frame 48) to a blade section 80 of the blade frame 70. The offset section 78 is appropriately fixed relative to the blade section 80. As such, the collar 72 and the blade section 80 of the blade frame 70 are offset in the vertical dimension. In the illustrated embodiment, the blade section 80 is at least generally semi-circular in shape, although other profiles may be appropriate.

A pair of blade assemblies 85 are interconnected with the blade section 80 of the blade frame 70 (e.g., FIGS. 1, 1A, 1B, and 5). In this regard, a pair of blade assembly mounting brackets 82 are appropriately fixed to the blade section 80 of the blade frame 70 in at least generally opposing relation (e.g., on opposite sides of the blade frame 70). Each blade assembly 85 generally includes a blade guide 86 having a blade guide mounting bracket 88 and a slot 90 that extends along at least a portion of its length (e.g., so as to accommodate a desired range of motion for the corresponding blade weldment 92). The blade guide mounting bracket 88 of each blade guide 86 is appropriately aligned with its corresponding blade assembly mounting bracket 82 on the blade section 80 of the blade frame 70. A corresponding locking pin 84 is then used to detachably interconnect each blade guide 86 with the blade frame 70. It should be appreciated that any appropriate way of detachably mounting each of the blade guides 86 to the blade frame 70 could be utilized. The noted detachable interconnection accommodates a more efficient storage of the tree spade 40. However and without affecting the overall functionally, each blade guide 86 could be fixed (e.g., welded) in any appropriate manner to the blade frame 70 as well.

Each blade assembly 85 also includes a shovel or blade weldment 92 that in turn includes a blade 94, a shaft 96, and a guide section 98 that is disposed between and interconnects the blade 94 and corresponding shaft 96. The guide section 98 of each blade weldment 92 is in the form of a rib or the like that extends through the slot 90 of the corresponding blade guide 86, and thereby allows each blade weldment 92 to be axially advanced relative to its corresponding blade guide 86 in a manner that will be discussed in more detail below. That is, the blade guide 86 accommodates disposing the shaft 96 of the corresponding blade weldment 92 within the interior of the corresponding blade guide 86 while having the corresponding blade 94 being disposed exteriorly of its corresponding blade guide 86. A locking pin 100 may be used to retain each of the blade weldments 92 in a transport position, where the blade 94 of each blade weldment 92 is vertically offset from the blade section 80 of the blade frame 70 and at a higher elevation than the blade section 80 (e.g., FIG. 1, FIG. 6A). Generally, engaging each locking pin 100 with its corresponding blade guide 86 engages one end of the guide section 98 of its corresponding blade weldment 92, and precludes the blade weldment 92 from any further advancement toward the ground. Removing each locking pin 100 allows for disposing each blade weldment 92 in an operational position (e.g., FIG. 6B) where the blade 94 of the blade weldment 92 is in contact with the ground. It may be desirable to include one more or additional locking pins or the like (not shown) between each blade weldment 92 and its corresponding blade guide 86 for the case where the blade guide 86 is disconnected from the blade frame 70 and handled by an individual. Without such a locking mechanism and if only the blade weldment 92 is grasped by the individual, the blade guide 86 could fall to the ground and impact the individual's foot or the like.

Movement of the blade frame 70 relative to the support frame 48 transfers the blade frame 70 between transport and operational positions. This movement of the blade frame 70 relative to the support frame 48 also moves the support frame 48 relative to the all terrain vehicle 12 between transport and operational positions as well. In this regard, the tree handling device 10 includes a pulley system 110 that interfaces with each of the all terrain vehicle 12, the support frame 48, and the blade frame 70. Reference will now be made primarily to FIGS. 1, 1A, 1B, and 1C.

The pulley system 110 includes a pair of pulleys 112 that are detachably interconnectable with the rear carriage rack 16 of the all terrain vehicle via a corresponding hook 114 or the like. One ATV pulley 112 is disposed on each side of the carriage rack link 46c (that pivotally interconnects the all terrain vehicle 12 with the column 54 of the support frame 48). Any appropriate way of detachably interconnecting the ATV pulleys 112 with the rear carriage rack 16 of the all terrain vehicle 12 may be utilized. The ATV pulleys 112 can also be detachably interconnected with different locations on the all terrain vehicle 12. Finally, the ATV pulleys 112 could be fixed to the all terrain vehicle 12, although a detachable interconnection is preferred.

A plurality of pulleys 116a-d are mounted to the support frame 48 of the tree spade 40 in any appropriate manner. Each pulley 116a-d is mounted on a plate in the illustrated embodiment. FIG. 1C has the various pulley mounting plates removed for clarity. Support frame pulleys 116a, 116b are disposed on one side of the support frame 48, with the support frame pulley 116b being disposed closer to the lateral midline of the tree spade 40 than the corresponding support frame pulley 116a. Support frame pulleys 116c, 116d are disposed on the opposite side of the support frame 48, with the support frame pulley 116c being disposed closer to the lateral midline of the tree spade 40 than the corresponding support frame pulley 116d. In the illustrated embodiment, the support frame pulleys 116a, 116d are disposed in an inclined position, while the support frame pulleys 116b, 116c are at generally disposed in a vertical dimension. Each of the support frame pulleys 116a-d may be of any appropriate size, shape, and/or configuration, may be disposed in any appropriate orientation, and may be mounted to the support frame 48 in any appropriate manner.

A pair of cables 118a, 118b are used by the pulley system 110 as well. One end 120 of cable 118a is anchored to the support frame 48, either directly (not shown) or indirectly by an adjustable turnbuckle 121 or the like (e.g., to allow for adjustment of the effective length of the cable 118a, for instance to have an effect on the "levelness" of the tree spade 40 and/or the timing of the movement of the support frame 48 and/or the blade frame 70). From here the cable 118a extends to and around one of the ATV pulleys 112, extends to and around the support frame pulley 116a, extends to and around the support frame pulley 116b, and has its opposite end 122 anchored to a cable anchor 76 on the blade frame 70 as well (the cable anchor 76 being located on the collar 72 in the illustrated embodiment). Similarly, one end 120 of cable 118b is anchored to the support frame 48, either directly (not shown) or indirectly by an adjustable turnbuckle 121 or the like (e.g., to allow for adjustment of the effective length of the cable 118b, for instance to have an effect on the "levelness" of the tree spade 40 and/or the timing of the movement of the support frame 48 and/or the blade frame 70). From here the cable 118b extends to and around the other of the ATV pulleys 112, extends to and around the support frame pulley 116d, extends to and around the support frame pulley 116c, and has its opposite end 122 anchored to the cable anchor 76 on the blade frame 70 as well (the cable anchor 76 again being located on the collar 72 in the illustrated embodiment). Movement of the blade frame 70 relative to the support frame 48 in the direction of the ground on which the all terrain vehicle 12 is disposed at least at some point in time will cause the support frame 48 to pivot relative to the all terrain vehicle 12 until the various supports 56, 58 of the support frame 48 contact the ground based upon the described pulley system 110. Similarly, movement of the blade frame 70 relative to the support frame 48 at least generally away from the ground on which the all terrain vehicle 12 is disposed at least at some point in time will cause the support frame 48 to pivot relative to the all terrain vehicle 12 to dispose the various supports 56, 58 of the support frame 48 in spaced relation to the ground.

The operation of the tree spade 40 will be summarized in relation to FIGS. 6A and 6B. The support frame 48 and the blade frame 70 are each movable between a transport position and an operational position. Both the support frame 48 and the blade frame 70 will be spaced from the ground on which the all terrain vehicle 12 is disposed when the tree spade 40 is in the transport position. FIG. 6A illustrates a position where the blade frame 70 is still disposed above the ground, but where the support frame 48 is not in its maximum vertically spaced position relative to the ground (i.e., it has already began its movement toward the ground). When the tree spade 40 is in the transport position, the collar 72 of the blade frame 70 will be disposed more toward the free end of the column 54 of the support frame 48 (more typically adjacent to the free end of the column 54). At this time, the hitch mounting frame links 46a, 46b may be at least generally horizontally disposed, or the end of these hitch mounting frame links 46a, 46b at the support frame 48 may actually be disposed at a slightly higher elevation than the end of the hitch mounting frame links 46a, 46b at the hitch mounting frame 42.

Turning the crank 74 (operating an actuator in one manner) when the tree spade 40 is disposed in its transport position will move the blade frame 70 axially relative to the column 54 of the support frame 48 and in the direction of the ground (e.g., the collar 72 of the blade frame 70 will move away from the free end of the column 54). This axial motion in this direction reduces the length of the segment of the cables 118a, 118b between the pulleys 116b, 116c on the support frame 48 and the cable anchor 76 on the blade frame 70. This axial motion in this direction also thereby increases the length of the segment of the cables 118a, 118b between the pulleys

116a, 116d on the support frame 48 and the corresponding ATV pulley 112. As such, the noted axial motion of the blade frame 70 causes the support frame 48 to pivot at least generally about an axis extending between the interconnection of the hitch mounting frame links 46a, 46b with the hitch mounting frame 42, and that directs the supports 56, 58 of the support frame 48 toward the ground. The pulley system 110 could be configured such that the supports 56, 58 of the support frame 48 and the blade section 80 of the blade frame 70 at least substantially simultaneously contact the ground. Alternatively, the pulley system 110 may be configured such that the supports 56, 58 of the support frame 48 will contact the ground prior to the blade section 80 of the blade frame 70 contacting the ground.

Typically after both the supports 56, 58 of the support frame 48 and the blade section 80 of the blade frame 70 are in contact with the ground on which the all terrain vehicle 12 is disposed, the locking pin 100 will be removed from each blade assembly 85. This will then allow the blade weldment 92 of each blade assembly 85 to move relative to its corresponding blade guide 86 such that its blade 94 contacts the ground and as illustrated in FIG. 6B. It should be appreciated that it may be desirable to slowly lower the blade weldment 92 into contact with the ground to avoid injury. Thereafter and as illustrated in FIG. 6B, the fencepost driver 132 may be disposed over the free end of the shaft 96 of one of the blade weldments 92 (this free end being opposite of the blade 94), and the fencepost driver 132 may be at least generally axially reciprocated to "pound" on the free end of the shaft 96 to drive the blade 94 into the ground the desired/required distance. This same operation may be repeated for the other blade assembly 85 as well.

The blades 94 of the blade weldments 92 are directed into the ground such that they are at least substantially adjacent to each other or at least sufficiently close to each other such that the tree and a core of dirt that encompasses its root system may be lifted by the tree spade 40. The free end of each blade weldment 92 may also be sized to act as a stop when engaged with the adjacent end of the corresponding blade guide 86. In any case, the crank 74 is rotated in the opposite direction to that described above and which lowered the tree spade 40, and which now axially advances the blade frame 70 relative to the support frame 48 and at least generally away from the ground to exert a lifting force on the tree and its dirt core. This lifts the tree and its dirt core out of the hole created by the above-noted operation of the tree spade 40. Typically after the blade frame 70 has axially advanced at least a certain distance (e.g., so that the tree and its dirt core have been removed from the hole created by the above-noted operation of the tree spade 40), continued operation of the crank 74 will also not only continue to axially advance the blade frame 70 relative to the support frame 48 in a direction that is at least generally away from the ground, but it will also cause the support frame 48 to pivot relative to the all terrain vehicle 12 at least generally about an axis extending between the interconnection of the hitch mounting frame links 46a, 46b with the hitch mounting frame 42 in a direction such that the supports 56, 58 now move at least generally away from the ground on which the all terrain vehicle 12 is disposed.

The above-noted axial motion of the blade frame 70 relative to support frame 48 and at least generally away from the ground increases the length of the segment of the cables 118a, 118b between the pulleys 116b, 116c on the support frame 48 and the cable anchor 76 on the blade frame 70. This axial motion in this direction also thereby decreases the length of the segment of the cables 118a, 118b between the pulleys 116a, 116d on the support frame 48 and the corresponding ATV pulley 112. The change of relative lengths of the sections of the cables 118a, 118b causes the support frame 48 to pivot from an operational position (where the supports 56, 58 of the support frame 48 are in contact with the ground) to a transport position (where the supports 56, 58 of the support frame 48 are spaced above the ground a desired distance). Again, typically the collar 72 of the blade frame 70 will be disposed at or close to the free end of the column 54 of the support frame 48 when the tree spade 40 is in its transport position.

The all terrain vehicle 12 may then be operated to transport the tree and its dirt core to a desired location. Typically this will be to a location where a hole has already been dug for the tree (e.g., using the tree spade 40). In any case, the all terrain vehicle 12 may be positioned so as to align the tree and its dirt core with the hole in the ground. Thereafter, the tree spade 40 may be moved from its transport position to its operational position in the above-noted manner so as to dispose the tree and its dirt core within the hole. Both blade weldments 92 may then be manually removed from underneath the dirt core by axially advancing the blade weldment 92 relative to its corresponding blade guide 86 (e.g. to retract each blade 94 from the ground). The locking pin 100 may thereafter be inserted to retain each blade weldment 92 in a desired position relative to its corresponding blade guide 86. Finally, the tree spade 40 may then be moved to its transport position in the above-noted manner for another operation in accordance with the foregoing.

The tree spade 40 is preferably detachably interconnectable or mountable to the all terrain vehicle 12. This then allows the all terrain vehicle 12 to be used for recreational activities or the like. Once again, it may be desirable to remove the shocks 28 of the all terrain vehicle 12 and install the above-noted rods 26, or to sufficiently increase the stiffness of these shocks 28, when using the tree spade 40 with the all terrain vehicle 12. Obviously it may be desirable to place the all terrain vehicle 12 back into its original configuration when the tree spade 40 is removed. Notwithstanding the desired detachability of the tree spade 40, the above-described functionality would obviously apply to a situation where the tree spade 40 is fixedly mounted to the all terrain vehicle 12. Although the above-described configuration of the tree spade 40 uses many detachable interconnections (e.g., to facilitate storage; to facilitate replacement of parts), at least certain interconnected components could be fixedly mounted to each other where appropriate.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A plant handling device, comprising:
    an all terrain vehicle; and
    a plant spade mounted on said all terrain vehicle, wherein said plant spade comprises:
        a first frame movable relative to said all terrain vehicle:
        a second frame movably interconnected with said first frame: and at least two blades that are each interconnected with and movable relative to said second frame:
a manually operable fencepost driver separately operatively actable on each of said blades: and
a fencepost drive carrier mounted on said all terrain vehicle and that accommodates storage of said fencepost driver.

2. The plant handling device of claim 1, wherein said plant spade is detachably mounted to said all terrain vehicle.

3. The plant handling device of claim 1, wherein said plant spade is movably interconnected with said all terrain vehicle.

4. The plant handling device of claim 1, wherein said plant spade is pivotally interconnected with said all terrain vehicle.

5. The plant handling device of claim 1, wherein said plant spade further comprises:
first, second, and third links that are each pivotally interconnected with said all terrain vehicle at spaced locations and further that are each pivotally interconnected with said first frame at spaced locations.

6. The plant handling device of claim 5, wherein said all terrain vehicle comprises an axle that extends in a lateral dimension, wherein said third link is pivotally interconnected with said all terrain vehicle at a location in said lateral dimension that is between where said first and second links are pivotally interconnected with said all terrain vehicle in said lateral dimension, and wherein said third link is pivotally interconnected with said first frame at a location in said lateral dimension that is between where said first and second links are pivotally interconnected with said first frame in said lateral dimension.

7. The plant handling device of claim 6, wherein said first and second links are pivotally interconnected with said first frame at a common elevation, and wherein said third link is pivotally interconnected with said first frame at a higher elevation than where each of said first and second links are pivotally interconnected with said first frame.

8. The plant handling device of claim 5, wherein said plant spade further comprises a pulley system interconnected with each of said all terrain vehicle, said first frame, and said second frame.

9. The plant handling device of claim 8, wherein said pulley system comprises a first cord and a first pulley, wherein said first pulley is mounted to said first frame, wherein said first cord comprises first and second ends, wherein said first end of said first cord is fixed relative to said first frame, wherein said first cord engages said first pulley between said first and second ends of said first cord, and wherein said second end of said first cord is anchored to said second frame.

10. The plant handling device of claim 9, wherein said pulley system further comprises a second cord and a second pulley, wherein said second pulley is mounted to said first frame, wherein said second cord comprises first and second ends, wherein said first end of said second cord is fixed relative to said first frame, wherein said second cord engages said second pulley between said first and second ends of said second cord, and wherein said second end of said second cord is fixed relative to said second frame.

11. The plant handling device of claim 10, wherein said pulley system further comprises third and fourth pulleys that are each mounted to said first frame, as well as a pair of ATV pulleys that are interconnected with said all terrain vehicle, wherein said first cord progresses from its said first end to one of said ATV pulleys, back to said first pulley, to said third pulley, and then to where its said second end is anchored to said second frame, and wherein said second cord progresses from its said first end to the other of said ATY pulleys, back to said second pulley, to said fourth pulley, and then to where its said second end is anchored to said second frame.

12. The plant handling device of claim 11, wherein a position of said first and third pulleys associated with said first cord is a mirror image of a position of said second and fourth pulleys associated with said second cord.

13. The plant handling device of claim 11, wherein said all terrain vehicle comprises an axle that extends in a lateral dimension, wherein a position of each of said third and fourth pulleys in said lateral dimension is between a position of said first and second pulleys in said lateral dimension, wherein a position of said third pulley in said lateral dimension is between a position of said fourth and first pulleys in said lateral dimension, and wherein a position of said fourth pulley in said lateral dimension is between a position of said third and second pulleys in said lateral dimension.

14. The plant handling device of claim 5, wherein each of said blades are independently and selectively movable relative to said second frame.

15. The plant handling device of claim 5, wherein each of said blades are maintained in a stationary position relative to said second frame in a first configuration, and wherein each of said blades are axially movable relative to said second frame in a second configuration.

16. The plant handling device of claim 5, wherein said all terrain vehicle comprises a hitch, wherein said plant spade further comprises a hitch mounting frame, wherein said hitch mounting frame is detachably mounted on said hitch, and wherein said first and second links are each pivotally interconnected with said hitch mounting frame.

17. The plant handling device of claim 16, wherein said all terrain vehicle further comprises a rear carriage rack, wherein said third link is pivotally interconnected with said rear carriage rack.

18. The plant handling device of claim 17, wherein said first frame comprises a column that at least generally extends in a vertical dimension, wherein said second frame is movably mounted on said column, and wherein said third link is also pivotally interconnected with said column.

19. The plant handling device of claim 18, wherein said plant spade further comprises a crank mounted on said second frame, wherein movement of said crank in one direction moves said second frame along said colunm in a first direction and simultaneously causes said first frame to pivot in a second direction, and wherein movement of said crank in another direction moves said second frame along said colunm in a third direction that is opposite of said first direction and simultaneously causes said first frame to pivot in a fourth direction that is opposite of said second direction.

20. The plant handling device of claim 1, wherein said plant spade further comprises a pulley system interconnected with each of said all terrain vehicle, said first frame, and said second frame.

21. The plant handling device of claim 1, wherein each of said blades are independently and selectively movable relative to said second frame.

22. The plant handling device of claim 1, wherein each of said blades are maintained in a stationary position relative to said second frame in a first configuration, and wherein each of said blades are axially movable relative to said second frame in a second configuration.

23. The plant handling device of claim 1, wherein said all terrain vehicle comprises a hitch, wherein said plant spade further comprises a hitch mounting frame, wherein said hitch mounting frame is detachably mounted on said hitch, and wherein said first frame is pivotally interconnected with said hitch mounting frame.

24. The plant handling device of claim 1, wherein said first frame comprises a column that at least generally extends in a vertical dimension, and wherein said second frame is movably mounted on said column.

25. The plant handling device of claim 24, wherein said plant spade further comprises a crank mounted on said second frame, wherein movement of said crank in one direction moves said second frame along said column in a first direction and simultaneously causes said first frame to move relative to said all terrain vehicle in a first manner, and wherein movement of said crank in another direction moves said second frame along said column in a second direction that is opposite of said first direction and simultaneously causes said first frame to move relative to said all terrain vehicle in a second manner that is opposite of said first manner.

26. The plant handling device of claim 1, further comprising an actuator, wherein a first activation of said actuator axially moves said second frame relative to said first frame in a first direction and simultaneously causes said first frame to undergo a first pivotal motion, and wherein a second activation of said actuator that is opposite of said first activation axially moves said second frame relative to said first frame in a second direction that is opposite of said first direction and simultaneously causes said first frame to undergo a second pivotal motion that is opposite of said first pivotal motion.

27. The plant handling device of claim 1, wherein said first frame comprises a plurality of supports engageable with a surface on which said plant handling device is supported.

28. The plant handling device of claim 1, further comprising a root cutter detachably mounted on said first frame.

29. The plant handling device of claim 1, wherein said all terrain vehicle comprises a hitch, wherein said plant spade further comprises a hitch mounting frame, wherein said hitch mounting frame is detachably mounted on said hitch.

30. The plant handling device of claim 1, wherein said all terrain vehicle comprises a rear axle, a body, and least one fixed-length rod that extends between said rear axle and said body.

31. A plant handling device, comprising:
an all terrain vehicle;
a plant spade mounted on said all terrain vehicle, wherein said plant spade comprises:
a first frame movable relative to said all terrain vehicle;
a second frame movably interconnected with said first frame; and
at least two blades that are each interconnected with and movable relative to said second frame; and
first, second, and third links that are each pivotally interconnected with said all terrain vehicle at spaced locations and further that are each pivotally interconnected with said first frame at spaced locations;
a pulley system interconnected with each of said all terrain vehicle, said first frame, and said second frame, wherein said pulley system comprises a first cord and a first pulley, wherein said first pulley is mounted to said first frame, wherein said first cord comprises first and second ends, wherein said first end of said first cord is fixed relative to said first frame, wherein said first cord engages said first pulley between said first and second ends of said first cord, and wherein said second end of said first cord is anchored to said second frame, wherein said pulley system further comprises a second cord and a second pulley, wherein said second pulley is mounted to said first frame, wherein said second cord comprises first and second ends, wherein said first end of said second cord is fixed relative to said first frame, wherein said second cord engages said second pulley between said first and second ends of said second cord, and wherein said second end of said second cord is fixed relative to said second frame, and wherein said pulley system further comprises third and fourth pulleys that are each mounted to said first frame, as well as a pair of ATV pulleys that are interconnected with said all terrain vehicle, wherein said first cord progresses from its said first end to one of said ATV pulleys, back to said first pulley, to said third pulley, and then to where its said second end is anchored to said second frame, and wherein said second cord progresses from its said first end to the other of said ATV pulleys, back to said second pulley, to said fourth pulley, and then to where its said second end is anchored to said second frame.

32. A plant spade attachable to an all terrain vehicle, comprising:
a first frame;
a second frame movably interconnected with said first frame; and
at least two blades that are each interconnected with and movable relative to said second frame, wherein said first frame comprises a column that at least generally extends in a vertical dimension, wherein said second frame is movably mounted on said column, wherein said plant spade further comprises a crank mounted on said second frame, wherein movement of said crank in one direction moves said second frame along said column in a first direction and simultaneously causes said first frame to move in a first manner, and wherein movement of said crank in another direction moves said second frame along said column in a second direction that is opposite of said first direction and simultaneously causes said first frame to move in a second manner that is opposite of said first manner.

33. The plant spade of claim 32, further comprising:
first, second, and third links that are each pivotally interconnected with said first frame at spaced locations.

34. The plant spade of claim 33, wherein said third link is pivotally interconnected with said first frame at a location in a lateral dimension that is between where said first and second links are pivotally interconnected with said first frame in said lateral dimension.

35. The plant handling device of claim 34, wherein said first and second links are pivotally interconnected with said first frame at a common elevation, and wherein said third link is pivotally interconnected with said first frame at a higher elevation than where each of said first and second links are pivotally interconnected with said first frame.

36. The plant spade of claim 32, further comprising a pulley system interconnected with each of said first frame and said second frame.

37. The plant spade of claim 32, wherein each of said blades are independently and selectively movable relative to said second frame.

38. The plant spade of claim 32, wherein each of said blades are maintained in a stationary position relative to said second frame in a first configuration, and wherein each of said blades are axially movable relative to said second frame in a second configuration.

39. The plant spade of claim 32, further comprising:
a hitch mounting frame, wherein said first frame is pivotally interconnected with said hitch mounting frame.

40. The plant spade of claim 32, wherein said first frame comprises a plurality of supports engageable with a supporting surface.

41. The plant spade of claim 32, further comprising a root cutter detachably mounted on said first frame.

* * * * *